N. F. BECK.
SHOCK ABSORBER.
APPLICATION FILED JULY 26, 1919.

1,343,027.

Patented June 8, 1920.

INVENTOR.
NORMAN F. BECK

BY *Carey S. Frye.*
ATTORNEY.

UNITED STATES PATENT OFFICE.

NORMAN F. BECK, OF KOKOMO, INDIANA.

SHOCK-ABSORBER.

1,343,027.  Specification of Letters Patent.  Patented June 8, 1920.

Application filed July 26, 1919. Serial No. 313,513.

*To all whom it may concern:*

Be it known that I, NORMAN F. BECK, a citizen of the United States, residing at Kokomo, in the county of Howard and State of Indiana, have invented certain new and useful Improvements in Shock-Absorbers, of which the following is a specification.

This invention relates to shock absorbers and particularly to that class adapted to be used in connection with semi-elliptical springs, although it will be understood that it may be successfully used in connection with other forms and makes of springs.

The prime feature of the invention is the provision of a lever or hanger which is used for connecting the sections of the spring together and is so arranged that the sections of the spring will have a substantially floating action one with the other, while the weight of the body of the vehicle mounted upon the spring will be suspended in the usual manner.

A further feature of the invention is the provision of a cushioning spring and so arrange the same with respect to the lever or hanger, that any jar incident to the wheels of the vehicle striking an obstruction will be practically entirely absorbed before it reaches the body of the vehicle and likewise any weight applied to the body of the vehicle will be directed against said cushioning spring as well as the vehicle spring thus setting up a floating action between the sections of the vehicle spring instead of imparting a stiff thrust action as is common with the vehicle springs of the ordinary construction.

A further feature of the invention is in so constructing the lever or hanger that no parts of the spring structure will require changing in order to attach the shock absorber thereto.

Other objects and advantages will be hereinafter more fully set forth and pointed out in the accompanying specification.

In the accompanying drawings which are made a part of this application,

Figure 1:
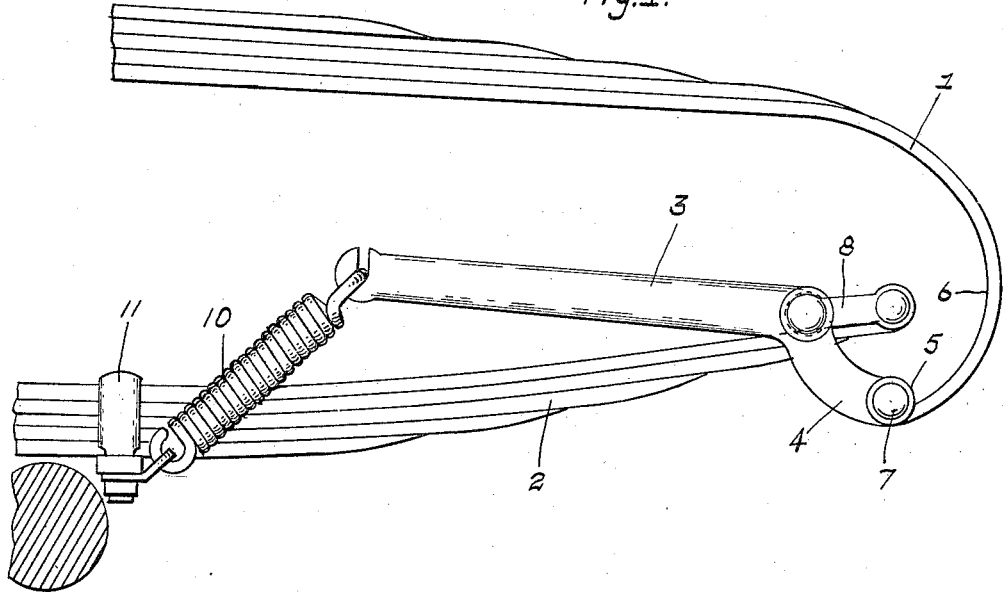
Figure 1 is a detail side elevation of a vehicle spring showing the shock absorber attached thereto.

Referring to the drawings in which similar reference numerals designate corresponding parts throughout the several views, 1 and 2 indicate, respectively, the upper and lower sections of a vehicle spring, such as is ordinarily used for supporting a vehicle body, and in this instance is of the semi-elliptical type, and ordinarily, the two sections of this form of spring are pivoted together at one end by means of a yoke, thus causing any strain upon one section of the spring to be imparted to the other section and consequently any jar or agitation upon one section of the spring will be imparted to the other section.

To overcome these objectionable features and provide means for practically absorbing the jar incident to the wheel of the vehicle striking an obstruction, a lever or hanger 3 is interposed between the sections 1 and 2, one end thereof being bifurcated and provided with downwardly and rearwardly extending arms 4, between the free ends of which the eye 5 of the curved end 6 of the upper spring section 1 projects, said end being pivoted to the arms by a bolt or pin 7.

In order to give the upper spring section 1 a substantially cantaliver action in its movements, a fulcrum point is provided for the lever 3 forwardly of the pivotal connection between the end of the section 1 and the arms 4, by providing a link 8, one end of which is pivoted between the bifurcated end of the lever 3 and the opposite end thereof to the eye opening 9 at the free rear end of the lower section 2 of the vehicle spring, the end of the link 8 between the bifurcated end of the lever 3 resting upon the section 2 and forming a fulcrum for the lever. Instead, therefore, of having the pivotal connection between the sections 1 and 2 extending in a vertical line between the ends of said sections, the fulcrum point or pivot point proper for the section 1 is forward of the rear end of the section 2, although the pivot end of the section 1 is normally directly below the free rear end of the section 2, consequently maintaining the same relative relationship between said sections as when they are connected in the usual manner, when the spring sections are normal.

The section 1 of the spring is normally held in uniform spaced relation with the section 2 by a coiled spring 10, one end of said coiled spring being attached to the free inner end of the lever 3, while the opposite end of the spring 10 is attached to any suitable stationary part of the vehicle, in this instance to a clip 11 employed for holding the sections of the spring member 2 together.

Should the section 2 of the body spring move upwardly, as when a blow is delivered to the wheel of the vehicle, or should the section 1 of the body spring move downwardly, as when weight is applied thereon, the coiled spring 10 will yield and permit the lever 3 to fulcrum, and thus direct the major portion of the strain against the coiled spring without materially flexing either section of the vehicle spring.

This gives a substantially floating action to the sections 1 and 2 of the vehicle spring and allows them to move independently of each other; consequently, when a blow or jar is delivered to the wheel of the vehicle, it is practically absorbed by the coiled spring 10 and consequently is not imparted to the body of the vehicle and does not reach the occupants of the vehicle. When sufficient weight is applied on the section 1 of the vehicle spring, the coiled spring 10 is flexed which permits the end of the section 1 to float or move in an arc of a circle around the end of the section 2 and does not materially flex either of the sections 1 and 2, as this is compensated for by the action of the coil spring 10.

Figure 2:
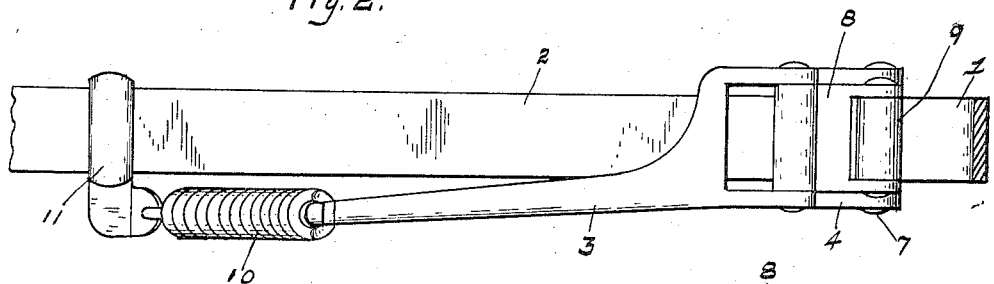
Fig. 2 is a top plan view of the shock absorber and the lower section of the spring, the upper section of the spring being shown in section.
Figure 3:
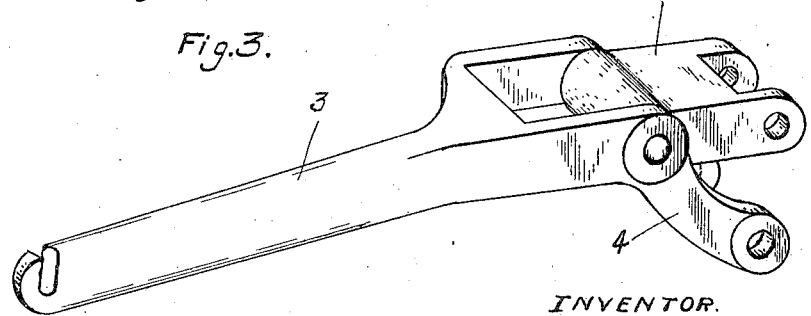
Fig. 3 is a perspective view of the lever or hanger portion of the shock absorber removed from the vehicle spring.

As best shown in Fig. 2 of the drawing, the shank of the lever 3 extends at an angle to the longitudinal plane of the spring sections 1 and 2 so that when the shank of the lever is given extreme movement on its fulcrum it will not contact at its moving end with either of the spring sections, but will freely swing past the edge of each section.

This form of device can be very cheaply manufactured owing to its simplicity, and can be easily and quickly attached to the vehicle spring as no parts of the spring have to be changed in any manner, except that the usual strap for attaching the ends of the spring sections together is dispensed with and the lever structure substituted therefor.

It will also be seen that by placing the fulcrum point of the lever forwardly of the rear end of the lower spring section 2 and resting the same on said spring section, the upper spring section 1 will be given a floating action and furthermore the coil spring 10 will act before the sections of the spring become flexed, thereby absorbing any shock or jar to which the parts of the vehicle may be subjected and consequently greatly enhancing the easy riding qualities of the vehicle.

The invention claimed is:

1. In a shock absorber, the combination with a pair of vehicle spring sections, of a lever structure having arms rigid with one end thereof and depending therefrom, means for pivotally connecting one of said spring sections with the free ends of said arms, means for pivotally connecting said lever to the other spring section, the pivot point of the lever being above and offset from the pivotal connection between said arms and spring section connected thereto, and a shock absorbing spring attached at one end to said lever structure and at its opposite end to a fixed point.

2. A shock absorber for elliptical body springs formed in pairs including a lever having a pair of integral downward and rearwardly extending arms at one end, the remainder of the lever comprising a single member disposed at an angle to the trend of the body spring for disposing the free end of the single member beyond and free of the side edge of the spring, and a shock absorber spring having one end anchored and the other end attached to the free end of said single member.

3. In a shock absorber, the combination with a pair of coöperating spring sections, of a lever one end of which is bifurcated to form integral arms, said arms curving downward and rearwardly, means for pivotally attaching one spring section between the free ends of said arms and at a point vertically below the end of the other spring member, a link pivotally connecting the other spring section to the lever, and a shock absorber spring attached to the inner end of said lever.

4. In a shock absorber, the combination with a pair of coöperating spring sections for vehicles, of a lever construction having its outer end bifurcated, said lever from the bifurcated portion to its inner end extending at an angle to the trend of the spring sections and positioning the inner end of the lever beyond one edge of the spring sections, means for pivoting one end of one of the spring sections to the bifurcated end of said lever, means for pivoting the other spring section to said lever so as to offset the fulcrum point of the lever construction from the pivot ends of the spring sections, and a cushioning spring at one edge of one of the spring sections and attached to the inner end of said lever construction.

5. In a shock absorber, the combination with a pair of vehicle spring sections one above the other, each having an eye opening at its end, the eye of the lower section being vertically above the eye of the upper section, of a lever construction between said spring sections, a pair of downward and rearwardly extending arms at one end of the lever and integral therewith, means for pivoting the eye opening of the upper spring section between the free end of said arms, a link having one of its ends pivoted to the end of the lower spring section and its opposite end to the lever construction, the latter end of the link resting upon the lower spring section and forming a fulcrum for the lever offset from the eye opening of the spring sections, and shock absorbing means attached to the opposite end of said lever construction.

In testimony whereof I hereunto affix my signature.

NORMAN F. BECK.